April 16, 1940.    G. J. GATES    2,197,178
DRYING APPARATUS
Filed March 29, 1937    3 Sheets-Sheet 1
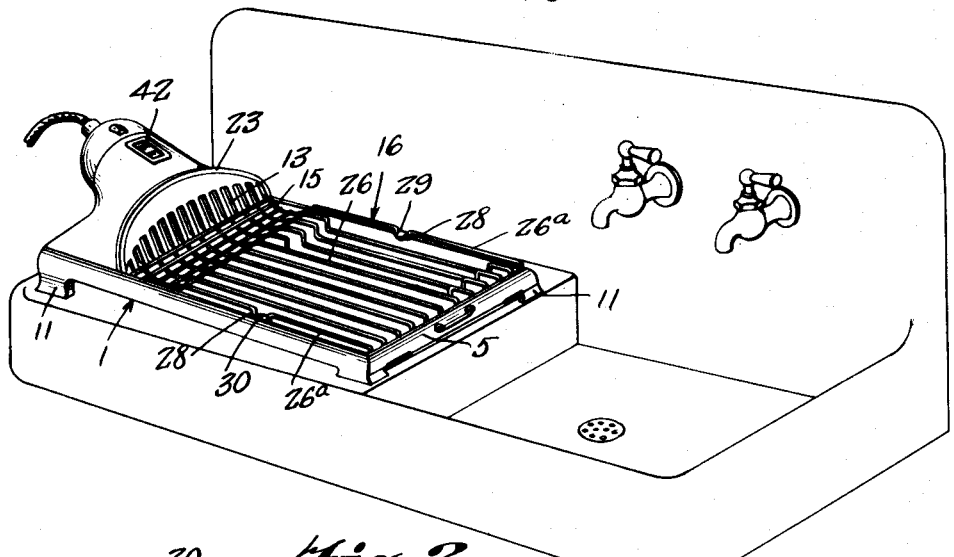
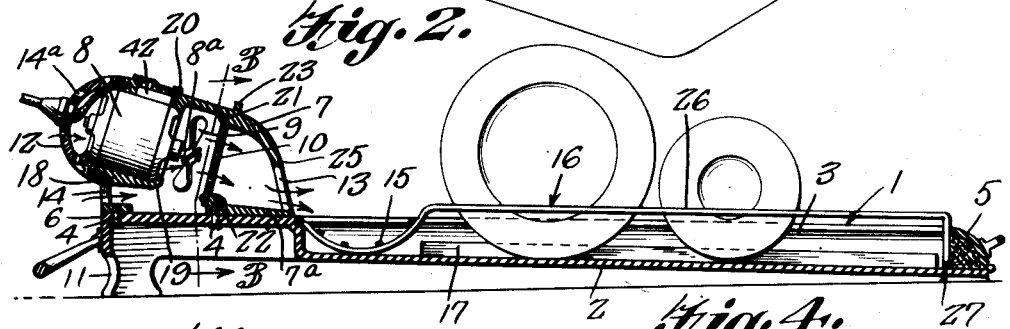
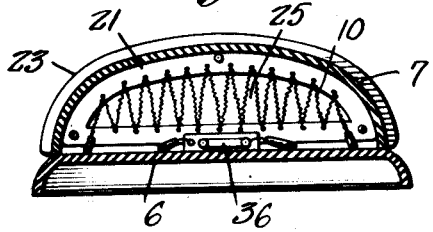
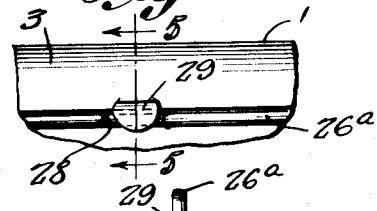
Gilbert Joseph Gates,
INVENTOR
BY Herbert M Birch
ATTORNEY April 16, 1940.  G. J. GATES  2,197,178
DRYING APPARATUS
Filed March 29, 1937　　3 Sheets-Sheet 2
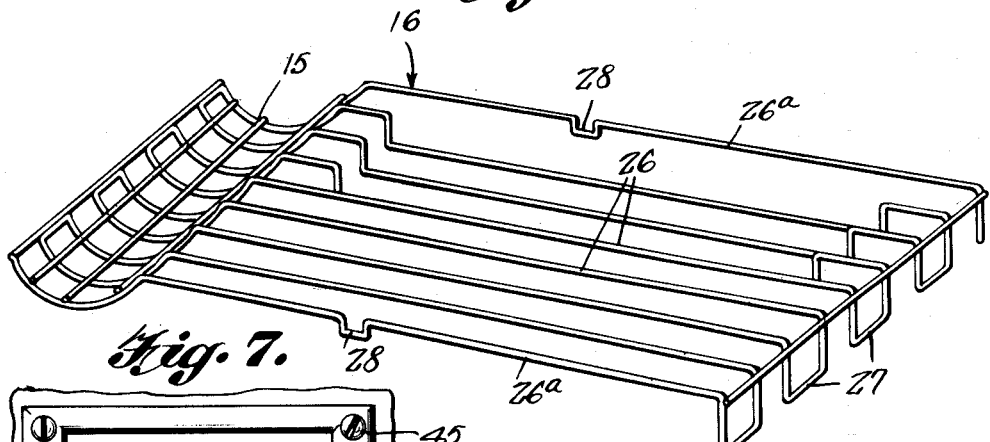
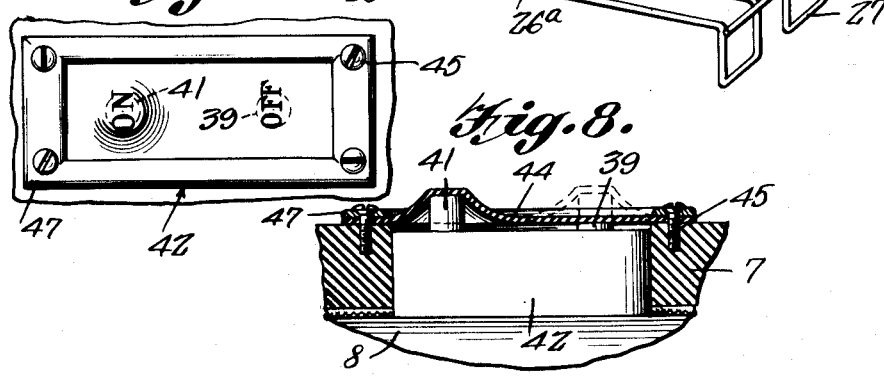
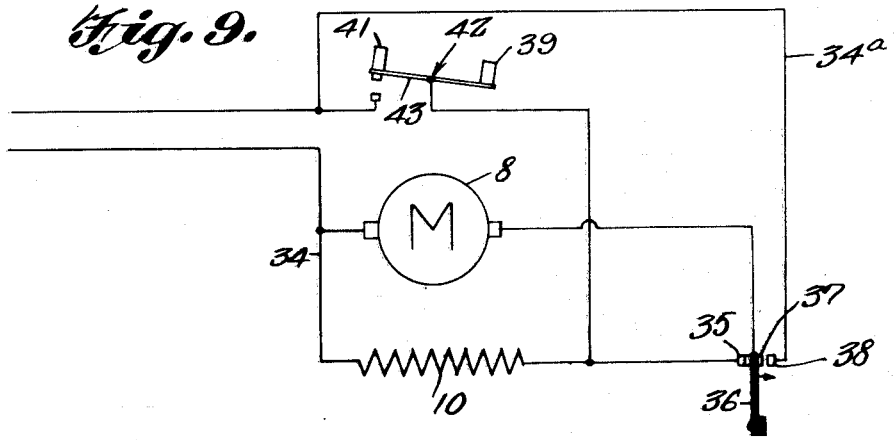
Gilbert Joseph Gates,
INVENTOR
BY Herbert M. Birch
ATTORNEY April 16, 1940. G. J. GATES 2,197,178
DRYING APPARATUS
Filed March 29, 1937 3 Sheets-Sheet 3

Gilbert Joseph Gates,
Inventor

By Herbert M. Birch
Attorney

Patented Apr. 16, 1940

2,197,178

UNITED STATES PATENT OFFICE 2,197,178

DRYING APPARATUS

Gilbert Joseph Gates, Arlington, Va.

Application March 29, 1937, Serial No. 133,672

8 Claims. (Cl. 34—26)

This invention relates to drying apparatus and more particularly to a device for drying dishes and other household articles.

It is an object of my invention to construct a simple and easily operated dish drier for home use that will take up no more space than the ordinary wire dish rack.

Another object of my invention is to provide for forcing and blowing heated air over and around the dishes and silverware put in an ordinary dish rack and further means for automatically cutting out the heated air and replacing the heated air with cool air to cool the dishes and silverware before handling them to put them away.

Yet another object of my invention is to provide a novel and improved construction in a combined drier and dish rack having novel drainage features.

And still another object is to provide an electric drier and article support constructed largely of light weight non-conducting material, whereby all danger of shock and short circuit of the electric drier is eliminated.

Further objects and advantages of my invention are disclosed in the following specification and claims, together with the accompanying drawings.

Figure 1 is a perspective view of my invention in position and ready for use.

Figure 2 is a side view in cross section of my invention as embodied in Figure 1 with some dishes shown in position in the rack.

Figure 3 is a cross section view taken along the line 3—3 of Figure 2 and shows the heating coil which faces the rack portion.

Figure 4 is a fragmentary view looking down on one side of the rack base to illustrate the means for securing the dish rack in place.

Figure 5 is a cross section view taken along the line 5—5 of Figure 4 to illustrate the detailed construction of the rubber base for holding the wire rack and means to prevent the dishes from sliding.

Figure 6 is a perspective view of my wire rack to be placed in the rubber base.

Figure 7 is a top plan view of the switch for starting and stopping the motor with waterproof covering therefor.

Figure 8 is a view in cross section of the start and stop buttons further illustrating the waterproof covering and how it is placed upon the drier hood and also, how the switch is secured within the drier hood.

Figure 9 is a diagrammatic view of the motor and heating circuit used in my drier unit.

Figure 10:
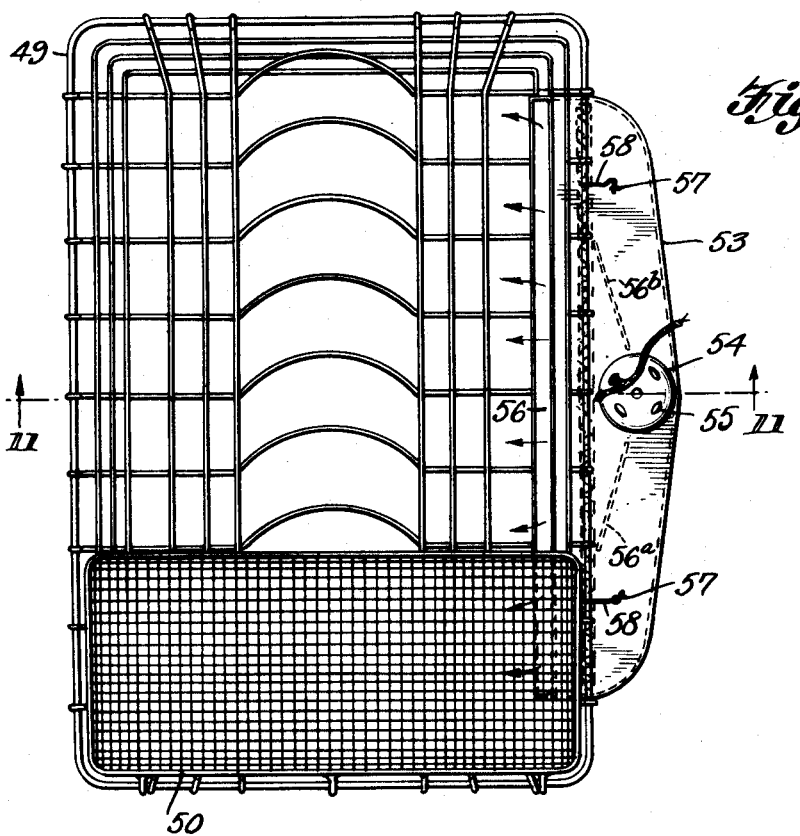
Figure 10 is a perspective view of a modification of my invention.
Figure 11:
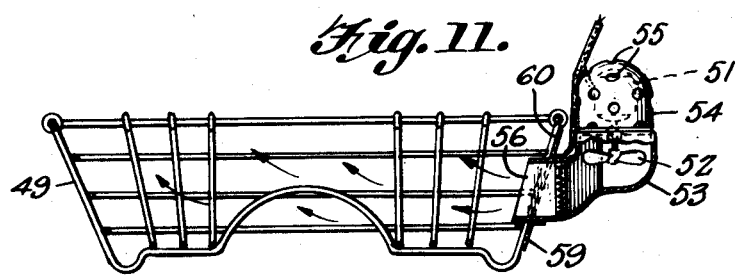
Figure 11 is a cross section view of Figure 10 along the line 6—6 with part of the drier elements in cross section.

Referring in detail to the drawings, 1 is a base of light weight rubber having a flat bottom portion 2, inwardly slanting arc-shaped side flanges 3, a drop hinged front portion 5 and a raised rear platform portion 6. The platform 6 is elevated by legs 11 and supports a rubber casing or hood 7 containing an electric motor 8, a fan 9 and resistance or heater coils 10.

The hood 7 is fastened to the platform 6 by bolts 4 which extend through the bottom of the platform 6 into the base portion 7a of the hood. Hood 7 has secured or molded within it at an end a supporting cradle 18 with its forward edge flanged upwardly at 19 and an opposing shoulder 20 depending from the top of the said hood 7 cooperating with the said flange 19 to prevent the motor from sliding forward in its tilted position. Attached to the motor armature shaft 8a is a fan 9 and in front of the fan a resistance or heater coil 10. The wire 10 is mounted within the hood 7 on an insulated frame 21. The frame 21 is secured to shoulders 22 by any suitable means. The shoulders 22 extend around the inside of the hood 7 back of the opening 13 so that the fan 9 will blow the air drawn through the hood around the the resistance heating coils 10 and out through opening 13.

On the outside top of the hood 7 at a point just beyond the resistance 10 is an arcuate shape upstanding flange 23. This flange 23 deflects any water which might drip from the hands of the dish washer when placing the articles to be dried in the rack and materially aids in keeping the splash away from the motor 8 and switch 42.

The drier hood 7 has an opening 13 extending across its front portion to form the mouth of the hood and smaller openings 14 and 14a in the rear portion thereof. The mouth opening 13 is for the emission of air forced forward by the fan 9, which air is sucked in through openings 14 and 14a at the rear portion of the hood 7. The air thus drawn through the hood by the fan and out through the mouth 13 is heated as it passes around the heater coil 10 to the bottom 2 of the drier base. The air is slightly preheated by contact with the motor as the fan 9 draws air in through openings 14a in hood cap 12 around the coils and armature of motor 8 and also affords ventilation for the motor. All air thus fed through the hood is directed downwardly by reason of the sloping top front portion 25 of hood 7. The heated air as it is forced downwardly to the bottom 2 of base 1 will pass over and under articles placed in trough 15 of rack 16, hereinafter described, converging together so as to pass beyond said trough 15 between the flanges 3 and 3 along the bottom 2. The bottom 2 has elongated air directing ribs 17 on its inner surface. These ribs 17 have a dual function, they being of sufficient height to confine the air in given paths and also to cooperate with the rack 16 to support dishes. To cooperate with the ribs in their air confining function I have specially constructed side flanges 3, which due to their arcuate shape will roll and tend to confine the air within the base 1, thereby further concentrating the drying medium. The air so fed being heated air will rise from the bottom portion 2 and circulate in contact with the articles in the rack 16.

The diagram in Figure 9 is of my electric drier motor 8 and heat resistance coil 10 connected to a common tap on line 34. One side of the resistance 10 goes to contact 35 which normally in the drier motors deenergized state makes contact with contactor 37 of the thermostat switch 36. Conact 38 goes to line 34a ahead of switch 42, said switch being supported or resting on top of the motor 8 and held in place by the hood 7 through which it protrudes.

The switch 42 fits snugly within an opening in the rubber hood 7 by friction and has a rubber covering or diaphragm 44. The covering 44 is of highly flexible material such as rubber and serves to make the switch waterproof, the same being secured to the hood by bolts 45 and 46 and rubber washers 47 and 48.

The motor 8 gets its current from line 34 and start button 41 in its normal state as shown. In this position the resistance 10 also gets current which as it heats the thermostat 36 in front of it causes the bi-metallic element of switch 36 to bend in a clockwise direction, see the arrow, thus establishing contacts 37 and 38. This breaks the motor circuit from the push button switch and places the motor 8 on line 34 and line 34a in front of start button contact on line 34a. The resistance 10 will continue to receive its current from line 34 and switch blade 43. When the stop button 39 is pressed resistance 10 connection is broken through switch blade 43 and motor circuit is left undisturbed. As the fan 9 and motor 8 are left undisturbed they will continue to operate so as to cool the thermostat and the dishes. When the bi-metallic element returns to normal position as shown the motor circuit is broken and contactor 37 reestablishes connection with contact 35 thus again placing the motor upon switch blade 43.

In general the drying operation is as follows: the motor and fan are started, the fan feeds heated air downwardly from the hood 7 into the rack base 1, between the upstanding ribs 17, which are high enough from the bottom 2 to confine the air between them and also support the dishes. The air on the outside of the ribs is further directed by the arcuate shaped flanges 3 and then rises upward and around the articles to be dried.

The cool air does not flow until the resistance 10 has been temporarily cut out as described above, and is used only to cool the dried articles before they are removed by hand from the rack 16.

The hinged portion 5, hereinbefore described, has on its inner face a filling of sponge rubber 5a or other suitable absorbent material. The absorbent material 5a absorbs most of the excess water that drops from the articles positioned in the rack. Also, portion 5 of the base 1 is hinged to swing downwardly from the base if more water should accumulate than the sponge 5 can absorb.

The modification shown in Figure 10 involves the same principle of operation hereinbefore described and include an article supporting rack 49 of wire and a silverware trough 50. Attached to the rack 49 is a drier including a motor 51, a fan 52, and an elongated hood 53. The hood 53 has a cap portion 54 with a plurality of small openings 55 formed therein within which is housed the motor 51. The said cap portion 54 extends vertically upward from the center top surface of the hood 53.

The hood 53 has an elongated flaring mouth portion 56 and resistance coils or heater wires 61 mounted within the said mouth portion 56 in any suitable manner in front of the motor 51 and fan 52. Also within the flaring mouth portion 56 are baffles 56a and 56b to better direct and spread the air blown from the mouth portion 56 by fan 52.

The rack 49 has an elongated opening on the side to which hood 53 is attached. The opening in the side of rack 49 being outlined or reinforced by suitable pieces 59 and 60. Said opening is of sufficient size to permit entry of the mouth portion 56 of the hood 53. Near each end of the hood 53 on the top surface is an eyelet 57. The eyelets 57 are engaged by hooks 58 secured to the upper wire strand of the rack 49 when and after the mouth portion 56 of the hood is inserted in the opening in the side of the rack. In this manner the hood 53 is secured to the rack 49 for operation.

Figure 12:
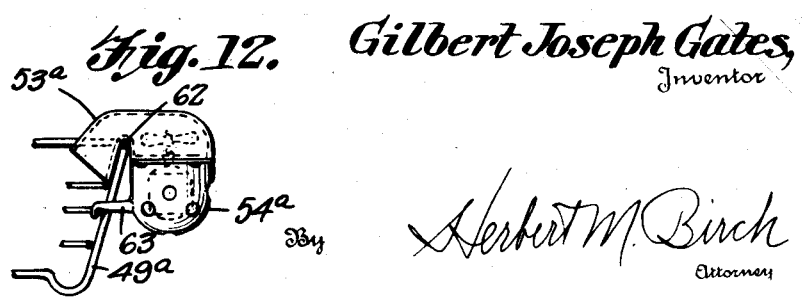
Figure 12 is a fragmentary view of another form or modification of my invention.

The form shown in Figure 12 is simply a variation in the shape of the drier, the hood 53a being shaped in the form of an open mouthed elongated hook so as to be engageable with the top wire 62 of the rack 49a. The drier is thus suspended from the rack 49a and is further held in position by means of hook 63 projecting from the hood cap 54a, said hook engaging with one of the side strands of wire in the side of rack 49a.

The operation of the modified form is practically identical to that shown and described in Figures 1 and 2, the difference being in the construction and positioning of the drier element with respect to the rack. In either case the drying medium is blown into the rack and around the articles therein.

While certain features of the present invention are more or less specifically described, I wish it understood that various changes may be resorted to within the scope of the appended claims.

What I claim is:

1. A drying device including a wire dish rack, an air directing hood having an elongated hook-shaped mouth resting upon the top wire of the said dish rack, a blower secured within the air directing hood and a supporting means extending from the said hood in engagement with a side wire of the said rack.

2. A dish drying device including a supporting base, a platform at an end of the base, a tray section extending below said platform with inturned air directing side portions, said tray section having longitudinally extending air directing ribs along the bottom thereof, a wire rack insert with longitudinally extending wire strands vertically parallel with said longitudinal air directing ribs housed in said tray section, an air directing hood secured to said platform above said tray section, air circulating means mounted within said hood and a heater element in front of said air circulating means within the said hood, whereby heated air is directed by said hood into said tray section of the base along said air directing ribs to dry dishes supported by said cooperating ribs and the wire strands of said wire rack insert.

3. A dish drying device including a supporting base, a platform at an end of the base, a tray section extending from the said platform with inturned air directing side portions, longitudinally extending air directing ribs along the bottom of said tray, a wire rack insert for said tray section adapted to cooperate with said longitudinal air directing ribs, an air directing hood secured to said platform, air circulating means mounted within said hood, and a heater element in front of said air circulating means, whereby heated air is directed by said hood into said tray section of the base along said air directing ribs to dry dishes supported by said cooperating ribs and wire rack.

4. A drying device including a wire dish rack, an air directing hood having an elongated mouth portion contiguous to said rack, an electric power starting circuit, a shunt circuit, a manually operated switch for said starting circuit, a blower secured within the said air directing hood operably connected in each of said circuits, a heater coil secured within the said elongated mouth portion of the hood operated only by said starting circuit with said blower when said manual switch is closed, a starting circuit contact, a shunt circuit contact, and a thermostatic switch secured to the elongated mouth portion of the hood responsive to heat from the heater coil, and adapted to first engage the starting circuit contact and then the shunt circuit contact when heated whereby the heater coil may be rendered inoperative independently of said blower when said manual switch is opened.

5. In combination with a dish supporting tray having elongated wire strands to support dishes in a substantially vertical position, an air directing hood with a mouth portion adapted to be secured to said dish supporting tray, a blower housed and supported within said hood and a heater coil secured within the mouth portion of the hood and facing the said dish tray, whereby to circulate air through said dish tray between the dishes vertically supported therein.

6. In combination with an article supporting means, a power line, an electric starting circuit, a manual control switch for said starting circuit, a shunt circuit, an electric motor and resistance coil in said starting circuit, a fan driven by said motor, air directing supporting means for said motor secured to said article supporting means, said resistance element being secured to the air directing means in front of said fan, a pair of contacts, one of said contacts being in the starting circuit, the other of said contacts in the shunt circuit, a thermostat switch between the said contacts initially engaging the said starting circuit contact and secured to the air directing means in front of said resistance element to complete the starting circuit through the resistance element and motor when the manual starting circuit switch is closed whereby the fan circulates air around the charged resistance element until the thermostat becomes heated and disengages from said starting circuit contact and engages with said shunt circuit contact to operate the electric motor independently of the resistance element when said manual control switch is opened.

7. In a dish drying device comprising a dish supporting tray having elongated dish supporting wire strands, adapted to support dishes vertically, a blower, an elongated hood open at an end housing said blower, fastening means to attach the blower to the dish tray and electrically controlled operating means for said blower, whereby when the electric controls are operated the blower directs air along the elongated wire strands of the dish tray between the dishes supported thereby.

8. In a dish drier comprising a base including supporting means for a blower, an open ended blower housing, an article supporting section contiguous to the open end of the blower housing, said article section having air directing means extending longitudinally thereof away from the open end of the blower, and a heater element in front of said blower secured to the blower housing, whereby heated air is directed by said blower housing into the article supporting section between the air directing means and articles confined therein.

GILBERT JOSEPH GATES.